United States Patent [19]

Jensen et al.

[11] Patent Number: 5,011,348

[45] Date of Patent: Apr. 30, 1991

[54] AUTOMATICALLY RETRACTABLE CENTERLINE RESTRAINT

[75] Inventors: Tom M. Jensen, Kirkland; Herbert E. Hamilton, Edmonds, both of Wash.

[73] Assignee: The Boeing Company, Seattle, Wash.

[21] Appl. No.: 451,434

[22] Filed: Dec. 15, 1989

[51] Int. Cl.⁵ .................................................. B60P 7/08
[52] U.S. Cl. ........................................ 410/79; 410/69
[58] Field of Search ................. 410/52, 69, 70, 75, 410/77, 78, 79, 80, 82, 83, 84, 85

[56] References Cited

U.S. PATENT DOCUMENTS

| | | | |
|---|---|---|---|
| 3,641,940 | 2/1972 | Evans | 105/369 A |
| 3,899,092 | 8/1975 | Nordstrom | 214/84 |
| 3,906,870 | 9/1975 | Alberti | 105/464 |
| 3,927,622 | 12/1975 | Voigt | 105/463 |
| 4,077,590 | 3/1978 | Shorey | 244/118 R |
| 4,331,412 | 5/1982 | Graf | 410/69 |
| 4,349,302 | 9/1982 | Ferguson, Jr. | 410/79 X |
| 4,457,649 | 7/1984 | Vogg et al. | 410/46 |
| 4,498,823 | 2/1985 | Trautman | 410/84 |
| 4,583,896 | 4/1986 | Vogg et al. | 410/69 |
| 4,696,609 | 9/1987 | Cole | 410/69 |

Primary Examiner—Frank E. Werner
Assistant Examiner—James T. Ellee
Attorney, Agent, or Firm—Christensen, O'Connor, Johnson & Kindness

[57] ABSTRACT

An automatically retractable restraint assembly for vertically restraining a body by engagement with its side. The centerline restraint (10) includes a pair of normally upright positioned inside heads (20), each head having an outwardly extending toggle (76) for engaging the side of a cargo body (14). The inside heads are automatically retractable into the frame (24) upon engagement by the cargo body after the preceding engagement of either of a pair of release wings (30). The inside heads are also spring loaded outwardly along the longitudinal centerline of the centerline restraint to maintain contact between the toggle and the cargo body should it attempt to move out of engagement. A pair of normally upright positioned and automatically retractable outside heads (22) are included to engage a cargo body of lesser widthwise dimension.

14 Claims, 10 Drawing Sheets

AUTOMATICALLY RETRACTABLE CENTERLINE RESTRAINT

TECHNICAL FIELD

This invention relates to restraint devices and, more specifically, to devices particularly useful in restraining cargo along the centerline of an airplane.

BACKGROUND OF THE INVENTION

In most large airplanes, it is standard for floor beams to run in a lateral direction, except in the wing box section where the floor beams run in a forward and aft direction. As a result, the floor beams over the wing box flex (i.e., expand and contract laterally) with movement of the wings. While this flexing may occur at any stage of the airplane's flight, it is most pronounced as the wings bounce up and down during taxiing, especially at high gross weights. With airplanes that carry fuel in their wings, the wings have an even lower resting position and the resulting wing bounce exerts even greater flexing to the floor beams than is found in airplanes not carrying fuel in this manner.

In cargo airplanes, loaded cargo containers and pallets normally sit two abreast across the width of the airplane, each container or pallet being vertically restrained to the main cargo deck on the inside by centerline restraints and on the outboard side by vertical restraints and side locks. Horizontal restraint is provided by end locks placed forward and aft of the containers or pallets, and/or by the side locks in the case of containers.

Current centerline restraints have a pair of vertically extending inside heads and a pair of vertically extending outside heads, each head having a horizontally extending toggle that extends outboard to engage a receptacle in the container or the top of the pallet, thereby providing vertical restraint. The toggle of each head is spring loaded such that it may be rotated out of engagement during the loading of the cargo. The inside heads typically used in current centerline restraints are disclosed in U.S. Pat. No. 3,906,870, issued to Alberti on Sept. 23, 1975. As shown, these inside heads are manually retractable and are designed to engage full-width containers and pallets (e.g., 96 inches on the Boeing 747 cargo airplane). While not disclosed in the Alberti patent, the outside heads of current centerline restraints are automatically retractable upon engagement by a container or pallet and are designed to vertically restrain containers and pallets of reduced width (e.g., 88 inches on the Boeing 747 cargo airplane).

In order for the cargo containers and pallets to be loaded, the distance from the centerline restraints to the outboard vertical restraints and side locks must be slightly greater than the width of the container or pallet. If not, there would not be the clearance required to move the cargo into position. Additionally, it is quite common for containers and pallets to be slightly undersized because the manufacturers do not closely follow the dimensional specifications set for the containers and pallets.

Consequently, the combination of a slight amount of clearance, an undersized container or pallet, and flexing of the floor beam may lead to the toggles of current centerline restraints being pulled out of engagement with the container or pallet over the wing box section of the airplane. If the vertical restraints and side locks on the outboard side are similarly pulled out of engagement, the container or pallet is no longer vertically restrained. When this occurs with large containers, which are not capable of being end locked, the container may become totally unrestrained and thereby lead to catastrophic events.

While loaded containers and pallets normally sit two abreast in cargo airplanes, extremely heavy loads must straddle the centerline of the airplane, usually over the wing box section. This positioning ensures that the load is balanced during flight both in a forward and aft direction and in a lateral direction. If not so positioned, the airplane's fuel efficiency is drastically cut and the safety of the flight is greatly diminished due to handling difficulties. Before a load can be positioned in this manner, it is necessary that the inside heads of current centerline restraints be manually retracted. Because centerline restraints are located at short intervals down the centerline of the wing box section, manual retraction of the heads is both tedious and time consuming.

As a result, there has been a long-felt need for a centerline restraint for vertically restraining cargo containers and pallets over the wing box section of cargo airplanes that maintains contact with the container or pallet during periods of extreme floor beam flexing, that is automatically retractable when a load must be positioned straddling the centerline of the airplane, and that attaches to existing mounts. This invention is directed to satisfying this need.

SUMMARY OF THE INVENTION

In accordance with this invention, an automatically retractable restraint assembly for vertically restraining a body by engagement with its side is disclosed. The restraint assembly includes a frame and a shaft, the shaft being mounted in the frame for rotation about a horizontal axis. A first head on the shaft, that rotates with the shaft, normally extends above the frame in an upright position and has a toggle extending outwardly therefrom to engage the side of, and thereby vertically restrain, the body. A locking means on the shaft, that also rotates with the shaft, has a pair of contacting surfaces disposed on opposite sides of the shaft and a pair of projections similarly disposed. A pair of release wings are pivotally mounted to the frame on opposite sides of the first head, each release wing having an extension in cooperative engagement with one of the contacting surfaces of the locking means. Rotation of one of the release wings, upon engagement by the body, disengages the extension to allow the first head to rotate downwardly into the frame upon engagement by the body. Upon rotation of the first head into the frame to a position below the bottom of the body, the projection engages the extension to lock the first head in a down position. The restraint assembly also includes a first biasing means for urging the first head back to its normally upright position after passage of the body, and a second biasing means for urging the first head toward the body should it attempt to move out of engagement with the toggle. Preferably, the restraint assembly also includes a retractable second head spaced from the first head to engage a body of lesser widthwise dimension.

BRIEF DESCRIPTION OF THE DRAWINGS

The foregoing and other features and advantages of the present invention will become more readily appreciated as the same becomes better understood by reference to the following detailed description of the invention when taken in conjunction with the accompanying drawings, wherein.

DETAILED DESCRIPTION OF THE INVENTION

Figure 1:
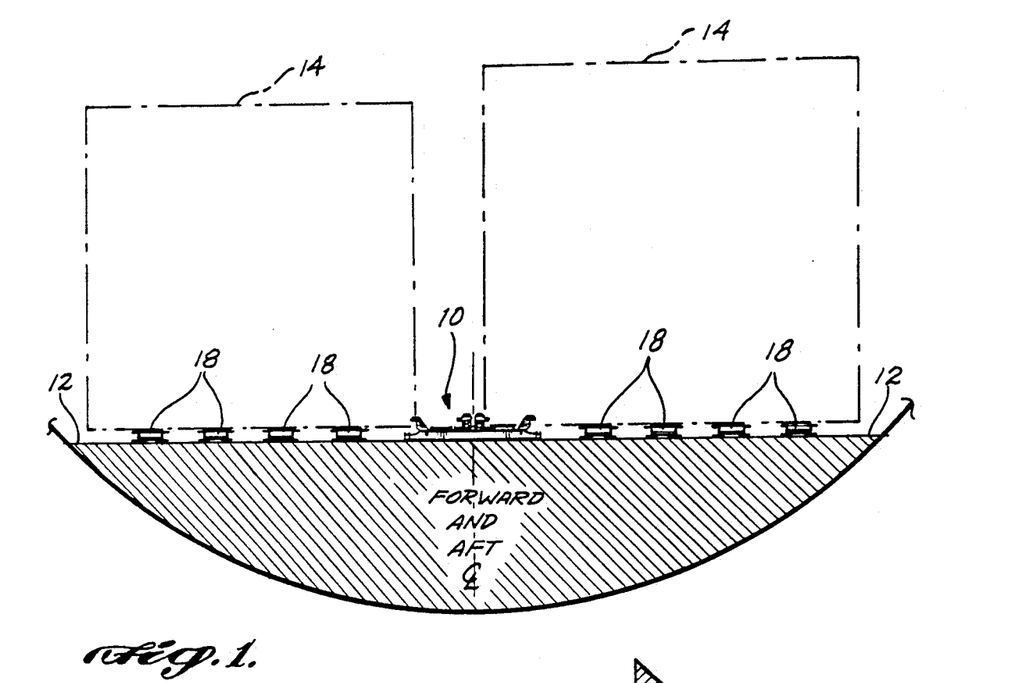
FIG. 1 is an environmental view of the interior of an airplane utilizing a centerline restraint made in accordance with the principles of the present invention, showing the centerline restraint engaging cargo containers (shown in phantom) of differing widthwise dimension.
Figure 2:
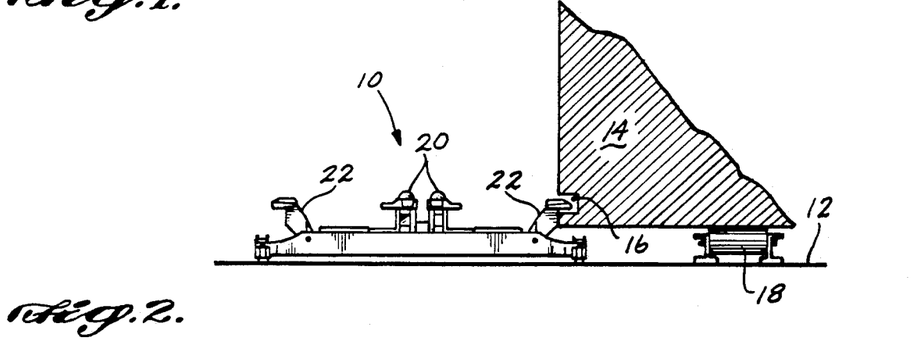
FIG. 2 is a side view of the centerline restraint of the present invention, showing an outside head engaging a cargo container.
Figure 3:
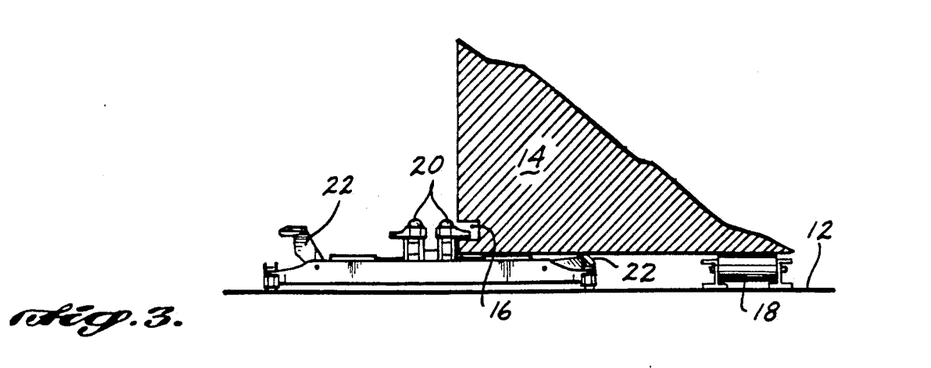
FIG. 3 is a side view of the centerline restraint of the present invention, showing an inside head engaging a cargo container.

As illustrated in FIGS. 1, 2, and 3, a series of centerline restraints 10 formed in accordance with the present invention may be employed along the forward and aft centerline of the main cargo deck 12 over the wing box section of a cargo airplane. The centerline restraints 10 are mounted to the main cargo deck 12 and are positioned so as to engage, and thereby vertically restrain, a cargo body 14, normally a cargo container or pallet. When the cargo body 14 is a cargo container, the centerline restraint 10 engages one of a series of receptacles 16 formed in the side of the container near its bottom surface. When the cargo body 14 is a cargo pallet (not shown), the centerline restraint 10 engages the top of the cargo pallet at a point along its inside boundary to provide the desired vertical restraint. To facilitate the onboard movement of the cargo body 14, a plurality of rollers 18 are usually mounted to the main cargo deck 12.

It is illustrated that the centerline restraint 10 includes a pair of inside heads 20 and a pair of outside heads 22. While not specifically shown in FIGS. 2 and 3, the centerline restraint 10 is designed to normally engage a cargo container or pallet on each side. Outside heads 22 are designed to engage narrow cargo containers or pallets of lesser weight, whereas inside heads 20 are designed to engage full-width containers or pallets of greater weight (see FIG. 1). In a Boeing 747 cargo airplane, for example, the widthwise dimension of the narrow containers and pallets is 88 inches, whereas the widthwise dimension of full-width containers and pallets is 96 inches. As shown in FIG. 3, the outside head 22 is retracted to a position below the bottom surface of a full-width container or pallet when an inside head 20 is utilized. The bottom surface of the cargo body 14, whether cargo container or pallet, moves along a roller plane established by rollers 18.

Figure 4:
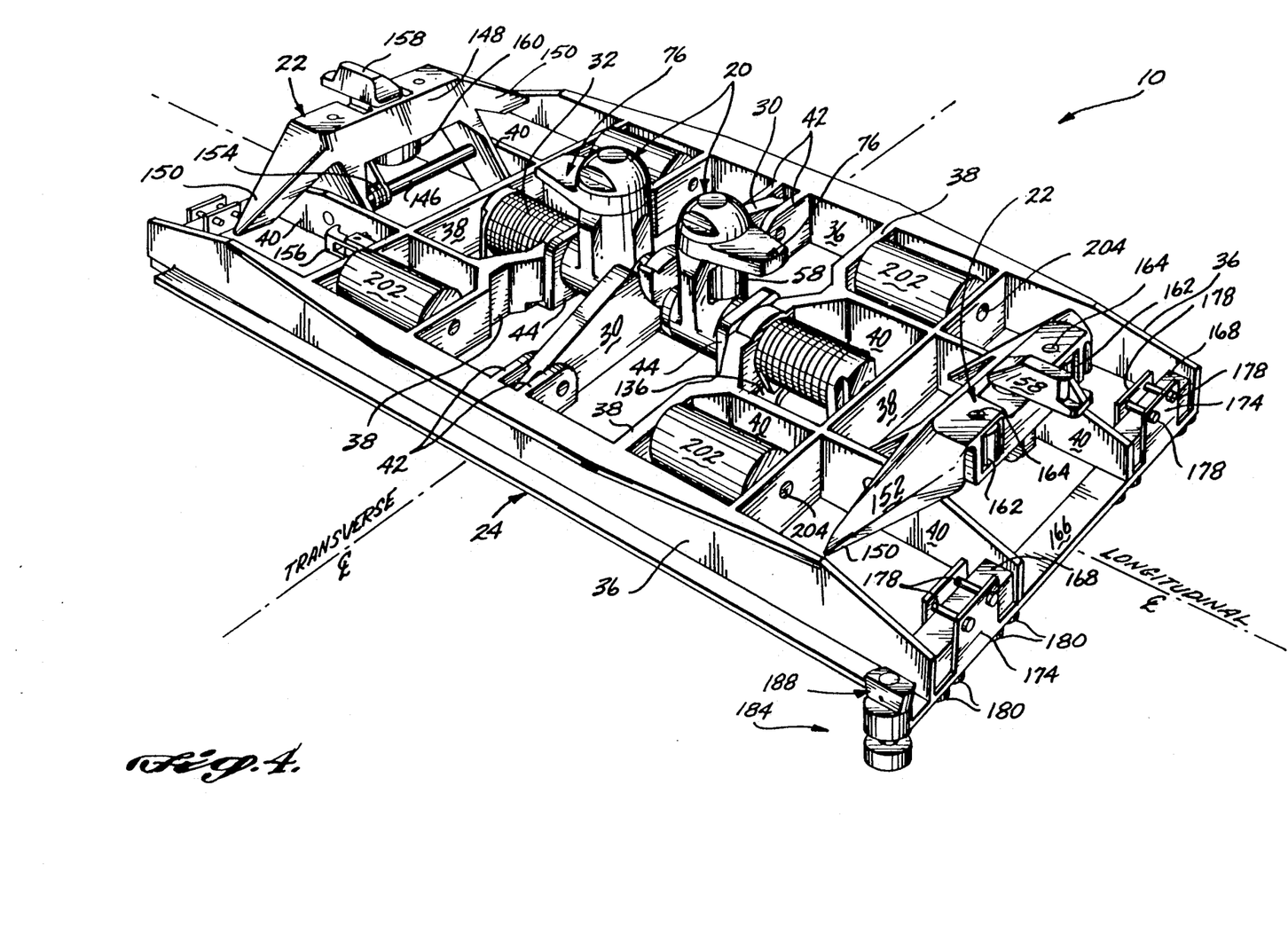
FIG. 4 is a perspective view of the centerline restraint of the present invention.
Figure 5:
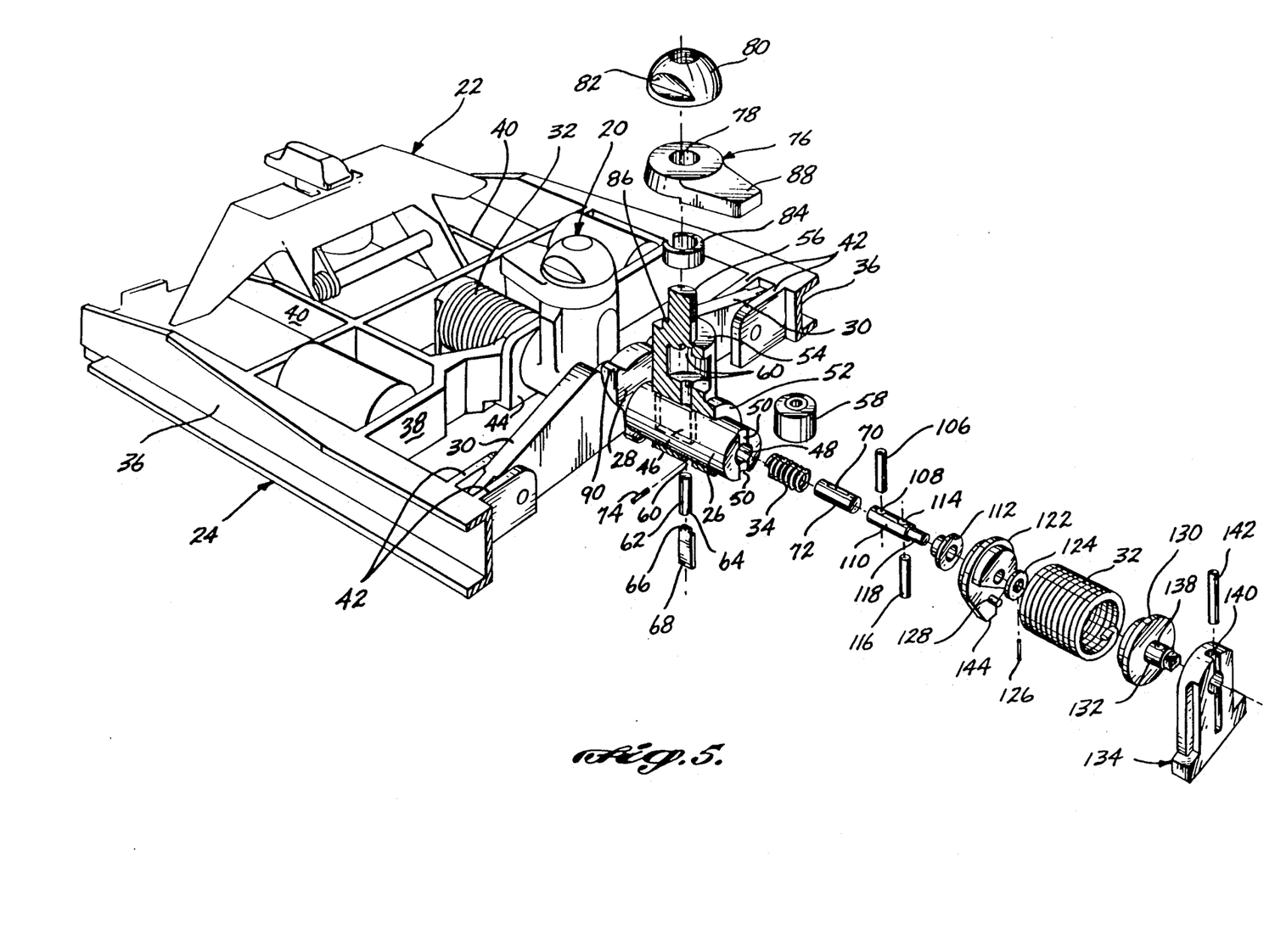
FIG. 5 is a partially exploded and sectional view of the centerline restraint shown in FIG. 4.
Figure 6:
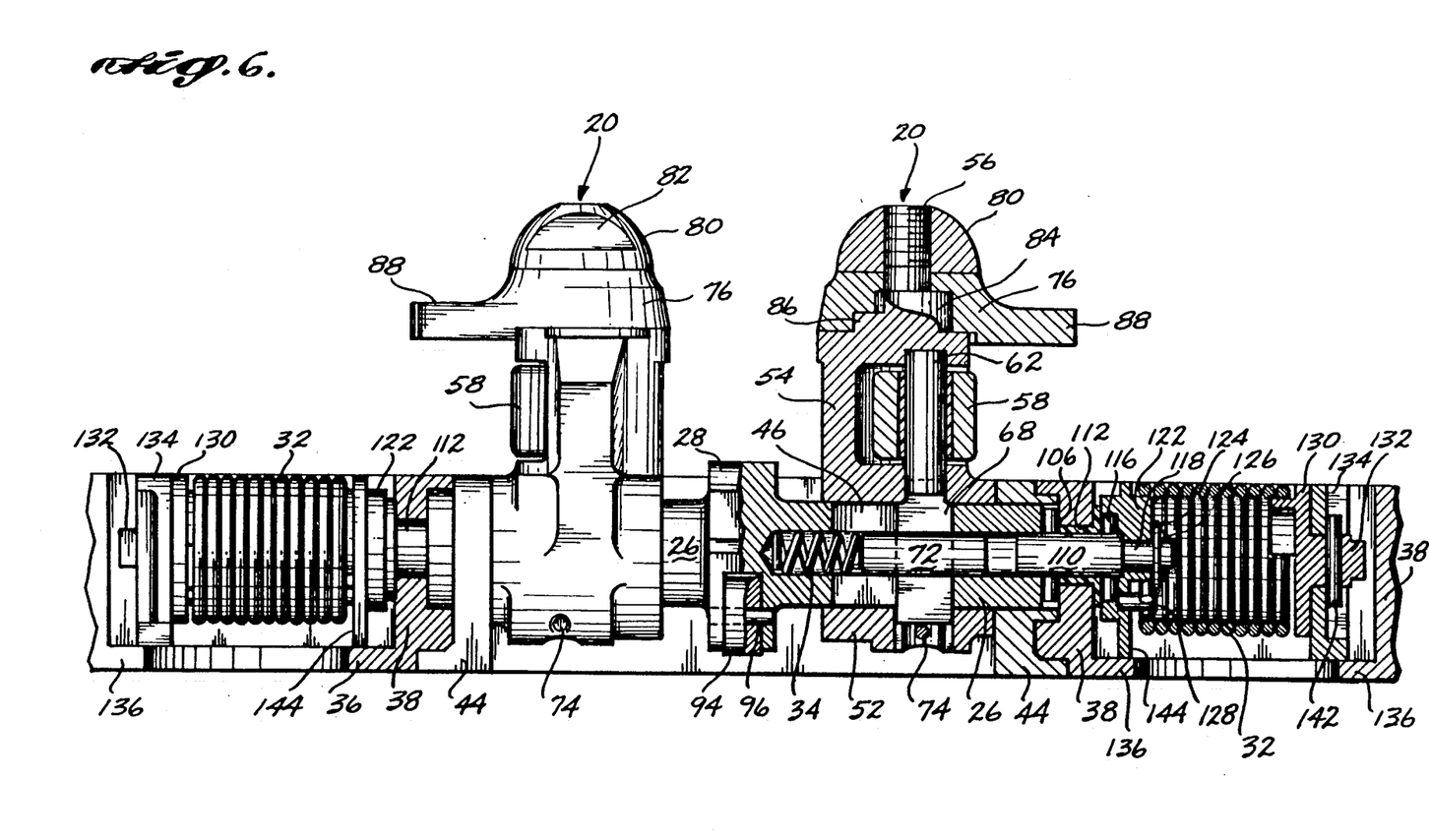
FIG. 6 is a partial sectional view of the central mechanism of the centerline restraint shown in FIG. 4, taken along its longitudinal centerline.

FIGS. 4, 5, and 6 illustrate an embodiment of the centerline restraint 10, generally including: a frame 24; a central mechanism, of which the inside heads 20 are a part; and outside heads 22. The central mechanism generally includes a shaft 26 to which inside heads 20 are mounted, the shaft being mounted in the frame 24 for rotation about a horizontal axis. A locking mechanism 28 is disposed on the shaft 26 at a location between inside heads 20, and a pair of release wings 30 are pivotally mounted to the frame 24 that, in conjunction with locking mechanism 28, either lock inside heads 20 in their normally upright position or allow the inside heads to rotate downwardly into the frame when either of the release wings 30 is engaged by a cargo body 14. A pair of springs 32 acting between the frame 24 and the shaft 26 serve to return the inside heads 20 to their normally upright position after passage of the cargo body 14, and a pair of springs 34 acting between the shaft 26 and inside heads 20 urge the inside heads toward the cargo body 14 should the cargo body attempt to move out of engagement.

The frame 24 is of generally rectangular shape, having an open top and a substantially open bottom. Frame 24 is designed to be attached to the main cargo deck 12 over the wing box section of the airplane, such that its transverse centerline coincides with the forward and aft centerline of the airplane. The preferred manner of attachment is more fully described below. The frame 24 includes a pair of longitudinal side members 36 extending the length of the centerline restraint 10, and includes spaced-apart transverse members 38 and spaced-apart longitudinal members 40 that allow the components of the centerline restraint to be mounted between adjacent members. A pair of flanges 42, to which release wings 30 are pivotally attached, extend inwardly from longitudinal side members 36 along the transverse centerline of centerline restraint 10. While it is possible that the pieces that make up frame 24 be separate parts connected by conventional methods, a more structurally sound centerline restraint 10 occurs if they are formed as a single piece. Of course, these are matters of design detail and may be varied.

Because the centerline restraint 10 of the present invention is generally symmetrical about its transverse centerline, the remaining discussion will describe only one-half of the centerline restraint where possible. Parts which are identical to those on the opposite side of the transverse centerline of the centerline restraint 10 have been given the same reference numerals. Given that the transverse centerline of the centerline restraint 10 coincides with the forward and aft centerline of the airplane, an inboard direction is toward the transverse centerline and an outboard direction is away from it in the following discussion.

The shaft 26 is disposed along the longitudinal centerline of the centerline restraint 10, with each end terminating at a location just inboard of the transverse member 38 located most inboard. A face plate 44 is mounted to the inboard side of this transverse member 38, the face plate containing an aperture sized to accommodate shaft 26 and thereby providing a support for the suspension and rotation of the shaft. The shaft 26 includes a head slot 46 extending completely through the shaft and oriented vertically along the longitudinal centerline of the shaft. A bore 48 extends inwardly from the end of the shaft and terminates at a position just outboard from the transverse centerline of the restraint 10. A vertically oriented drive slot 50 is formed in the terminal end of the shaft 26, extending along a diameter of the shaft. Head slot 46, bore 48, and drive slot 50 are designed to accommodate components that will be later described.

Inside head 20 includes a cylindrical base portion 52 having a circular recess formed through it sized to accommodate the shaft 26. Extending orthogonally upward from the base portion 52 is a cylindrical central portion 54, and then a cylindrical partially threaded reduced portion 56. Central portion 54 has a recess formed in it sized to receive a roller 58 which, when positioned, extends slightly outboard beyond the central portion to make contact with the side of the cargo body 14 and thereby facilitate its forward and aft movement. To mount inside head 20 to the shaft 26 and to mount roller 58 to the central portion 54 of the inside head, a central bore 60 extends through base portion 52 and central portion 54 and extends slightly into partially threaded reduced portion 56. A generally cylindrical roller axle 62 extends through roller 58, thereby providing an axis of rotation for the roller. One end of the roller axle 62 is flat and rests against the terminus of central bore 60, whereas the other end of the roller axle contains a grooved recess 64 sized to receive a reduced portion 66 of a head key 68. Head key 68 extends upwardly through a vertically oriented slot 70 formed in a cylindrical spring follower 72, the spring follower being sized to fit snugly within the bore 48 of shaft 26. A set pin 74 is placed at the bottom of head key 68 to ensure that the head key and roller axle 62 are maintained in their proper positions. It is the head key 68 that provides the connection between inside head 20 and shaft 26 that causes them to rotate in unison.

Inside head 20 also includes a vertical restraint toggle 76 having an aperture 78 sized to accommodate the unthreaded part of partially threaded reduced portion 56. A threaded cap 80 is threaded into place atop vertical restraint toggel 76, the threaded cap having a pair of tool engaging recesses 82 formed in it to assist the attaching process. Vertical restraint toggle 76 includes a recess (not shown) that houses a return leaf spring 84. Return leaf spring 84 contacts the terminus points of the recess in toggle 76 and a stop 86 in the partially threaded reduced portion 56, such that a lip portion 88 of the toggle 76 may be horizontally rotated from its normally outboard extending position upon engagement by the sidewall of the cargo body 14 (if a container), and thereafter returned after passage of the cargo body.

Inside head 20 may be pushed slightly inboard by the cargo body 14 during loading, thereby placing it in a spring-loaded position, so that the inside head is biased in an outboard direction to maintain contact between the lip portion 88 and the cargo body should it attempt to move out of engagement. This spring loading is accomplished by the spring 34 being disposed within bore 48, between the inboard end of spring follower 72 and the terminus of the bore. Inboard and outboard movement of the inside head 20 occurs along the length of head slot 46.

Figure 7:
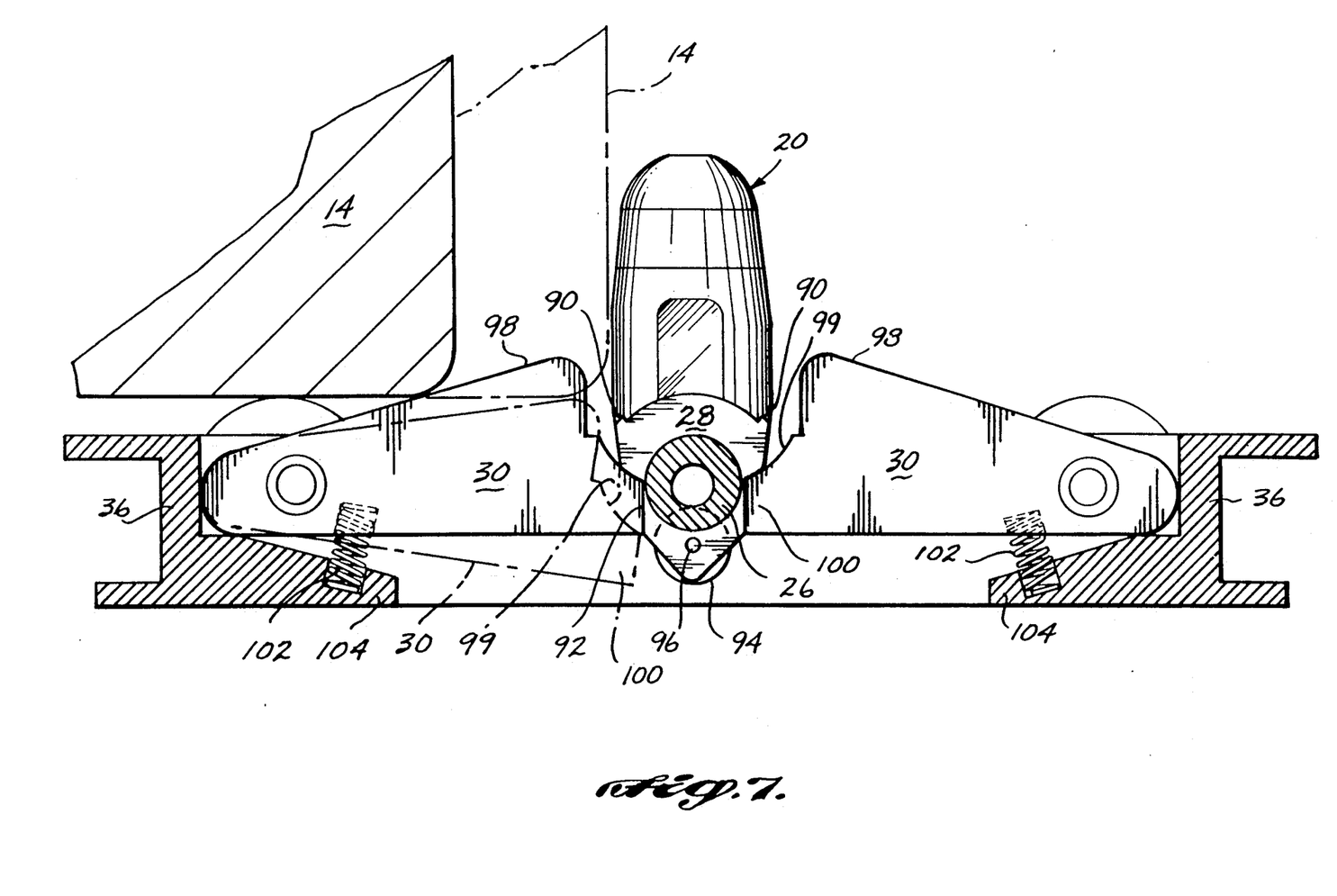
FIG. 7 is a schematic view of the central mechanism of the centerline restraint shown in FIG. 4, taken along its transverse centerline and showing an inside head in its normally upright position.

The centerline restraint 10 also includes a locking mechanism 28 disposed on the shaft 26 between inside heads 20 at the transverse centerline of the restraint (see FIGS. 5, 6, and 7). While not required, it is preferable that the locking mechanism be structurally integral with the shaft. The locking mechanism 28 includes a pair of upwardly extending projections 90 located on opposite sides of shaft 26, and a pair of flat contacting surfaces 92 also located on opposite sides of the shaft, but below the projections. A roller 94 is disposed in a recess in the bottom of locking mechanism 28, and is held in place by axle 96 extending through the locking mechanism. The functions of the components of locking mechanism 28 are more fully described below.

A pair of release wings 30, pivotally mounted to the frame 24 at flanges 42, extend inwardly along the transverse centerline from longitudinal side members 36 to cooperatively engage the locking mechanism 28. Referring to FIG. 7, each release wing 30 has an upwardly sloping engagement surface 98, a curved surface 99, and an extension 100 designed to engage the contacting surface 92 of locking mechanism 28 when the inside head 20 is in its normally upright position. In this manner, the inside head is locked in its upright position by extension 100. A spring 102 is disposed between a recess in release wing 30 and a recess in a tongue 104 to upwardly bias the release wing 30, thereby upwardly biasing the extension 100 of the release wing into engagement with contacting surface 92 of locking mechanism 28. The tongue 104 extends inwardly from longitudinal side member 36 of frame 24 and is integral with flanges 42.

A biasing mechanism allows the inside head 20 to be rotated downward under tension into the frame 24 upon engagement by the cargo body 14, and provides the biasing force necessary to return the inside head to its normally upright position after passage of the cargo body. In short, the biasing effect imparted to inside head 20 is provided by spring 32 generally acting between the shaft 26 and the frame 24. The components used to make this connection between the shaft and the frame are discussed in the paragraphs below. The components will be described in their inboard to outboard occurrence, best illustrated in FIGS. 5 and 6.

A cylindrical follower pin 106 is received within an inboard hole 108 in an intermediate actuator 110, with the inboard end of the intermediate actuator being received within bore 48 at the terminal end of shaft 26 and the follower pin being received in the drive slot 50 of shaft 26. The middle portion of intermediate actuator 110 extends through an aperture formed in inboard transverse member 38 and is surrounded by a thrust washer 112. The intermediate actuator 110 also includes an outboard hole 114 which receives a cylindrical drive pin 116, and includes a reduced portion 118 extending in an outboard direction.

Figure 11:
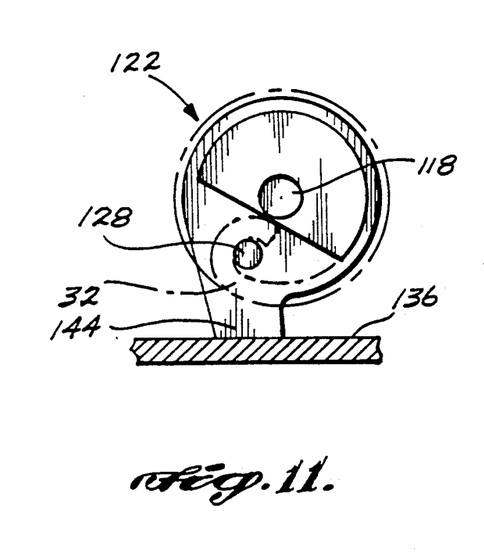
FIG. 11 is a detail view of the outboard side of a rotational stop exploded in FIG. 5.
Figure 12:
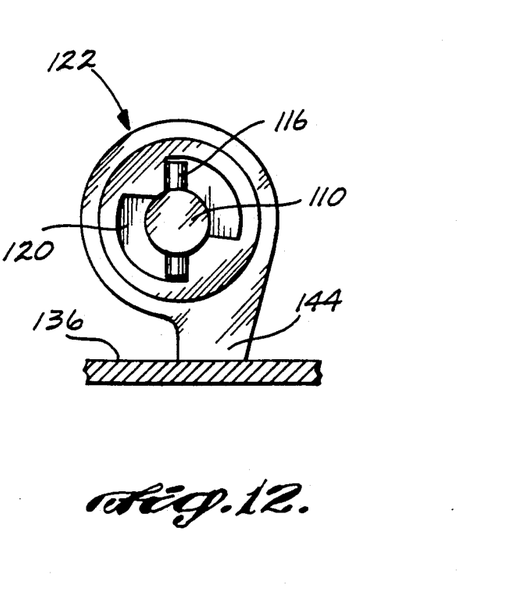
FIG. 12 is a detail view of the inboard side of the rotational stop shown in FIG. 11.

Referring to FIGS. 6, 11, and 12, the drive pin 116 is received within a lost motion recess 120 formed in the inboard side of a rotation stop 122. The rotation stop also has an opening formed through its center, sized to accommodate the reduced portion 118 of intermediate actuator 110. A washer 124 is placed around the reduced portion 118 at the outboard side of rotation stop 122, and is held snugly in place by a cotter pin 126 to maintain the connection between the rotation stop and the intermediate actuator. Because rotation stop 122 has a peg 128 extending outwardly from its outboard side that engages one free end of spring 32, the above-described components have served to connect the shaft 26, and thereby the inside head 20, to spring 32.

The other free end of spring 32 engages a peg (not shown) extending outwardly from the inboard surface of a preload stop 130. The preload stop 130 has a cylindrical reduced portion 132 extending outwardly from its outboard surface that is received within a pedestal bracket 134. Pedestal bracket 134 is mounted to a partial floor 136 formed in the bottom of the compartment located just outboard of inside head 20, the compartment being defined by transverse members 38 and longitudinal members 40. The reduced portion 132 of preload stop 130 has a vertical recess 138 extending through it, and pedestal bracket 134 has a vertical channel 140 formed in it, both the recess and the channel being sized to receive a pin 142. After pin 142 has been set, the above-described components have served to connect the spring 32 to the frame 24. The preload stop 130 may be rotated before inserting pin 142, thereby pre-tensioning the spring 32. To keep the spring 32 from rotating inside head 20 beyond its normally upright position, the rotation stop 122 has a flat stop portion 144 that engages partial floor 136 to prevent over-rotation.

Referring to FIGS. 5 and 12, it will be appreciated that rotation stop 122 exploded in FIG. 5 will only act upon spring 32 when the inside heads 20 are rotated in a clockwise direction (when viewed from the exploded end of the centerline restraint 10). When the inside heads 20 are rotated in a counterclockwise direction, the drive pin 116 simply travels within the lost motion recess 120 of the rotation stop and the spring 32 remains unengaged. However, the rotation stop 122 (not exploded) on the opposite side of the transverse centerline is configured to act upon its spring 32 when counterclockwise rotation occurs, but not upon clockwise rotation.

With extremely heavy loads, it is often necessary for the cargo body 14 to straddle the forward and aft centerline of the airplane over the wing box section. The outside heads of current centerline restraints, and the outside heads 22 of centerline restraint 10 of the present invention (described in detail below), are automatically retractable. While the inside heads on current centerline restraints must be manually retracted before a cargo body may be so situated, the inside heads 20 of centerline restraint 10 are automatically retractable.

Figure 8:
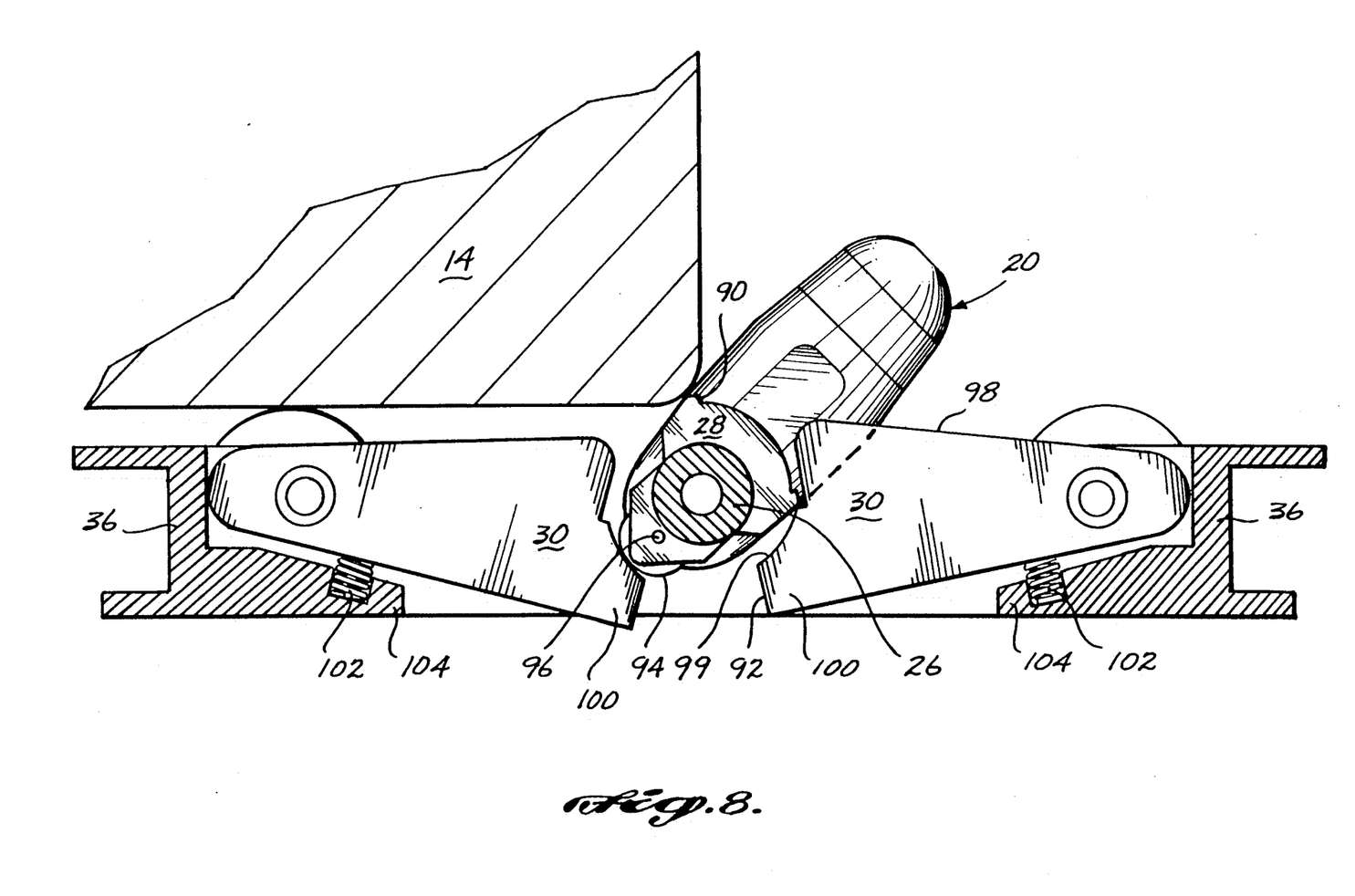
FIG. 8 is a schematic view similar to FIG. 7. showing the inside head in a partially rotated position upon initial engagement by a cargo container.
Figure 9:
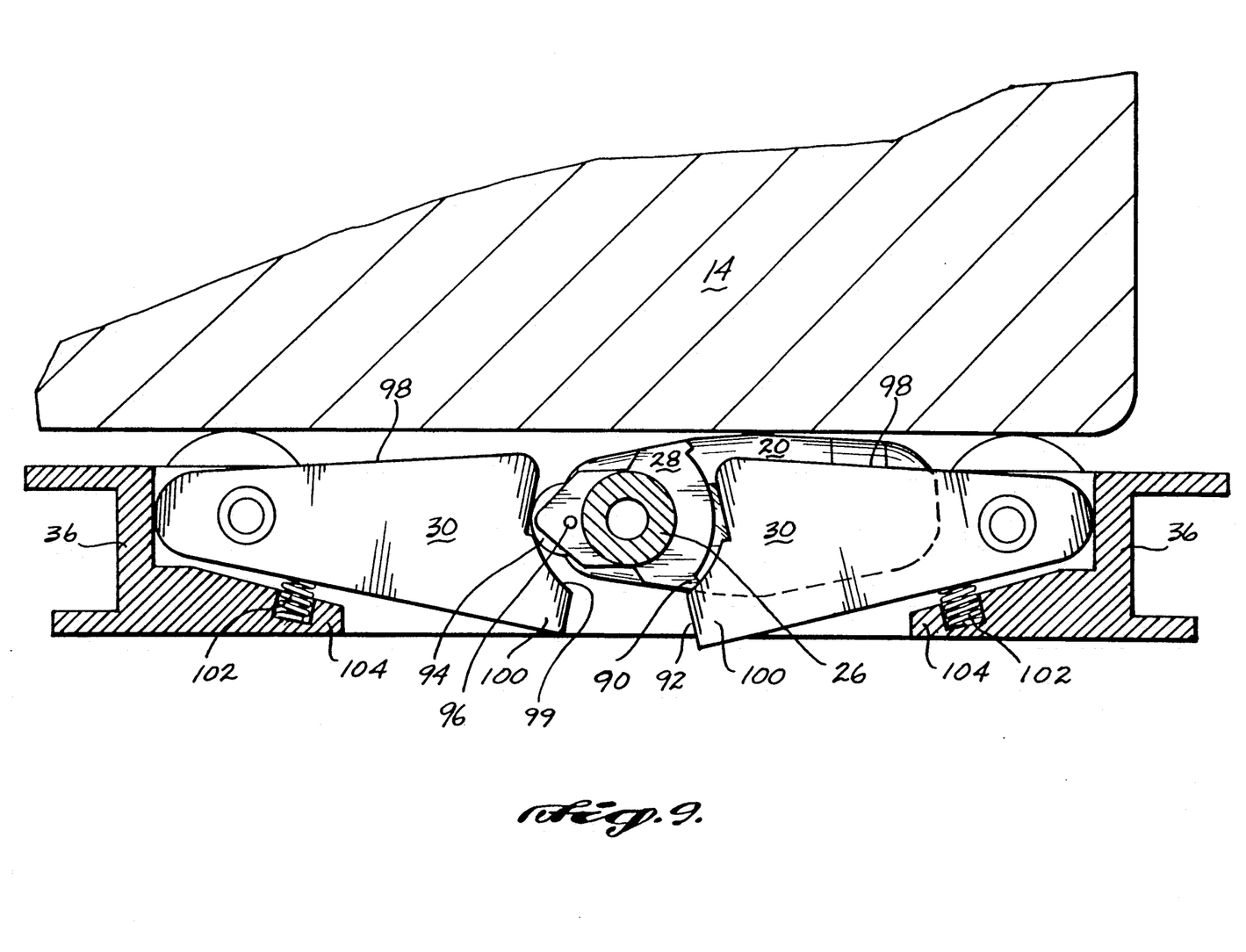
FIG. 9 is a schematic view similar to FIG. 7, showing the inside head in its knocked-down position upon complete engagement by the cargo container.

The automatically retractable operation of inside heads 20 of the present invention is best understood by reference to FIGS. 7, 8 and 9. As the cargo body 14 engages release wing 30, its extension 100 is pivoted downwardly out of engagement with the contacting surface 92 of locking mechanism 28, thereby allowing the inside head 20 to be rotated down into the frame upon subsequent engagement by the cargo body. As shown in FIG. 8, roller 94 of locking mechanism 28 begins and maintains contact with the first engaged release wing 30 during rotation of inside head 20. Additionally, the projection 90 opposite the first engaged release wing 30 makes contact with the second release wing 30 to push it down into the frame and out of the way of the approaching cargo body 14. When the cargo body has passed completely over inside head 20, thereby placing the head in its knocked-down position (see FIG. 9), the projection 90 is still in contact with the curved surface 99 of the second release wing 30. From its knocked-down position, inside head 20 is free to return to its normally upright position after passage of the cargo body 14 through the biasing assistance of spring 32 (described above).

Figure 10:
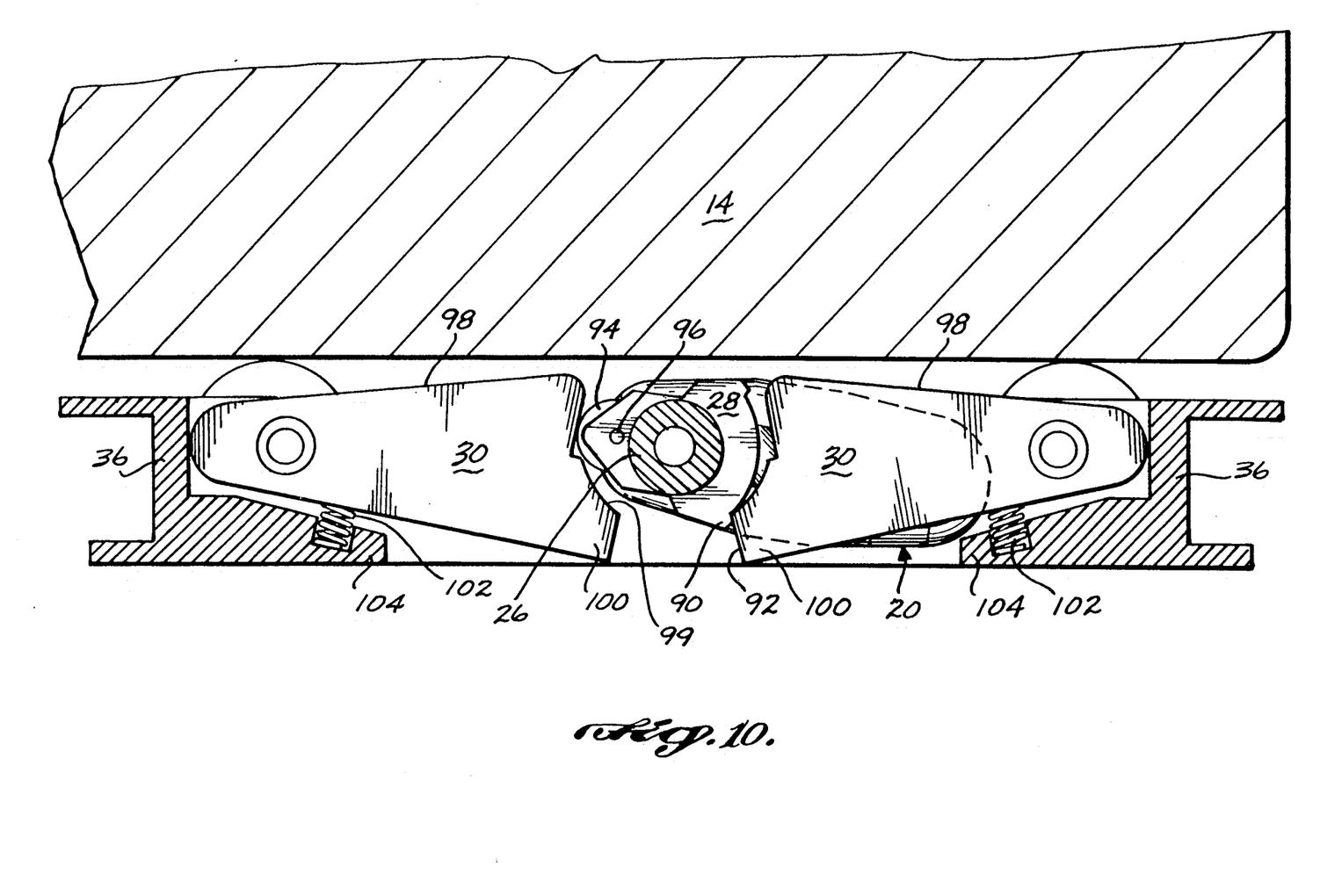
FIG. 10 is a schematic view similar to FIG. 7, showing the inside head in its locked down position.

The inside heads 20 of the present invention also have a locked down position, from which the inside head does not return to its normally upright position after passage of the cargo body 14 (refer to FIG. 10). This locked down position is achieved by rotating the inside head far enough below the bottom surface of the cargo body that projection 90 passes beyond curved surface 99 and engages extension 100 of the second release wing 30. To deactivate this locked status, the second release wing 30 must be manually pivoted downwardly such that the extension 100 is pulled out of engagement with projection 90 and the inside head 20 is thereby free to return to its normally upright position.

An outside head 22 is pivotally mounted to the longitudinal members 40 of frame 24 through axle 146 at each end of the centerline restraint 10, as best illustrated in FIG. 4. The outside head 22 includes a central base 148 having a tapered extension 150 on each forward and aft side. The tapered extension 150 has an upwardly sloping camming surface 152, which causes the outside head 22 to retract downwardly into the frame 24 upon engagement by a cargo body 14. A spring 154, acting between the base 148 and the frame 24, returns the outside head 22 to its normal upwardly extending position after passage of the cargo body. A release mechanism 156, mounted to longitudinal member 40, engages the base 148 upon collapse of the outside head 22 downwardly into the frame to a position below that incident to the passage of a cargo body 14 (i.e., a position below the bottom surface of the cargo body). Manual actuation of the release mechanism 156 disengages the base 148 and allows outside head 22 to return to its normally upright position through the action of spring 154.

Just as with inside heads 20, each outside head 22 has a vertical restraint toggle 158 extending in an outboard direction from the base 148 to engage and thereby vertically restrain the cargo body 14. Similarly, in order that the vertical restraint toggle 158 is free to rotate out of the way during loading of cargo, it is connected to a return leaf spring (not shown) mounted within a housing 160 integral with the base 148. Additionally, a pair of rollers 162, having a vertical axis of rotation, are mounted to base 148 by axles 164 to facilitate forward and aft movement of the cargo body. As previously discussed, the outside heads 22 of the present invention are designed to engage a cargo body 14 of less than full widthwise dimension, and therefore of lesser weight. Furthermore, outside heads 22 possess none of the inboard/outboard spring-loaded aspects of inside heads 20 (fully described above), and therefore are not effective in counteracting flexing of the floor beams over the wing box section of the airplane.

Figure 13:
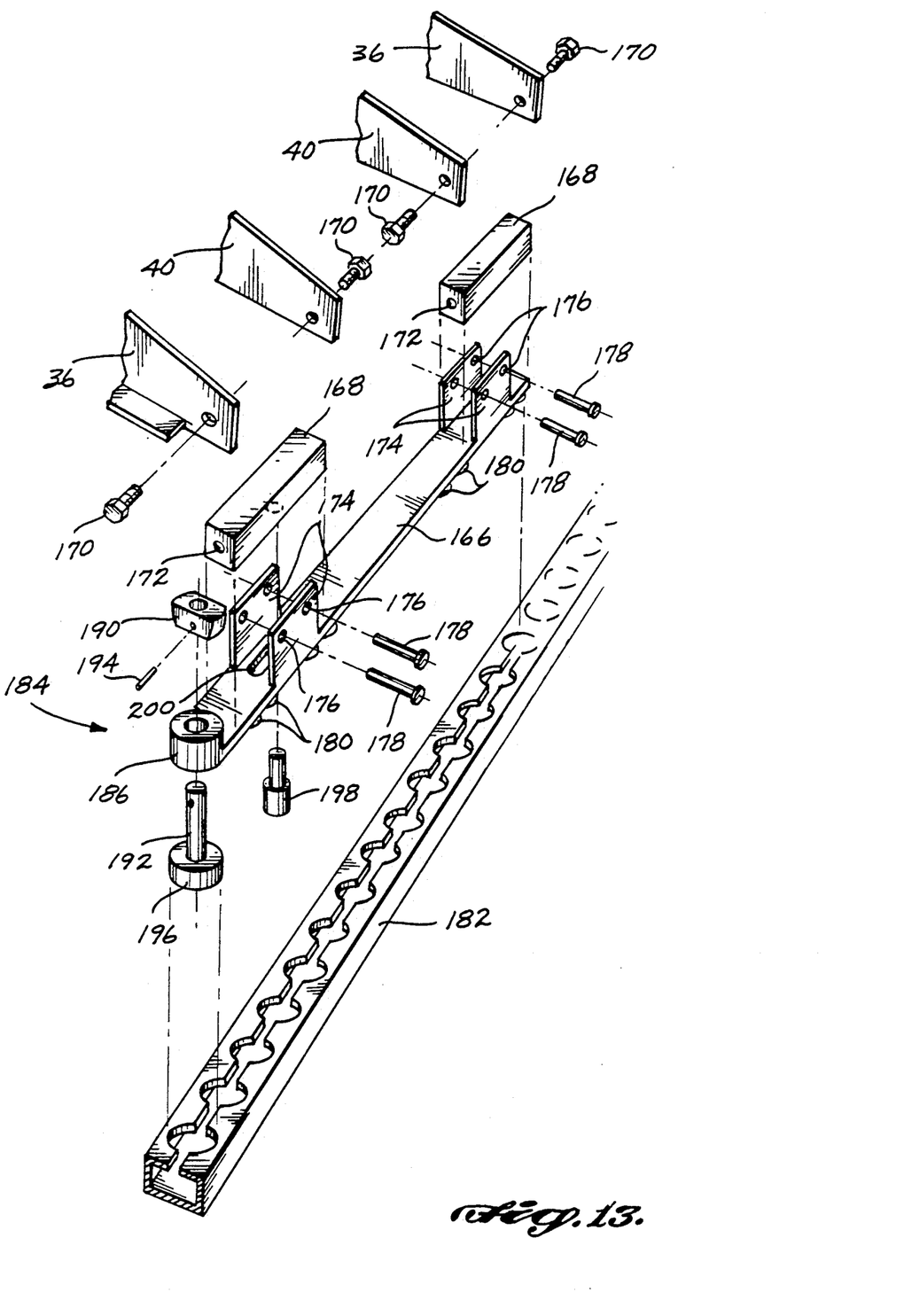
FIG. 13 is an exploded detail view of the fastening means of the centerline restraint shown in FIG. 4.

The centerline restraint 10 of the present invention may be attached to its working surface by a multitude of conventional methods. However, it is preferable that it be capable of attachment to the seat tracks being used to secure existing centerline restraints. Consequently, the fastening mechanism for the centerline restraint 10 of the present invention has been so designed, as is illustrated in FIGS. 4 and 13.

A bar 166 is slidably mounted to the frame 24 through a pair of support beams 168, the support beams being mounted between longitudinal side members 36 and longitudinal members 40 by a pair of threaded bolts 170 extending through the members and engaging a threaded recess 172 in the ends of each support beam. At two locations generally aligned with support beams 168, a pair of spaced-apart flanges 174 extend upwardly from bar 166, and have holes 176 sized to receive pins 178 which rest atop the support beams, thereby allowing the bar to slide along the support beams. A plurality of seat track studs 180 designed to engage a substantially continuous seat track 182 are located along the bottom surface of bar 166. The seat track studs 180 may be threaded into, or formed integral with, the bar.

A seat track lock 184 is located on one end of the bar 166. The seat track lock includes a raised boss 186 formed in the bar and a plunger 188 that is slidably mounted within the boss and is engagable with the seat track 182. The plunger 188 has a gripping head 190 attached to a cylindrical shaft 192 by a set pin 194, and an engagement stud 196 integral with the opposite end of shaft 192.

It has proven desirable to be able to slightly move the frame of the centerline restraint relative to its fastening mechanism because of the difference in spacing between centerline restraints versus spacing between receptacles of cargo containers. For example, in a Boeing 747 cargo airplane the receptacles are placed every 20⅛ inches along the cargo container, whereas the centerline restraints are positioned every 20 inches along the forward and aft centerline of the airplane. This positioning at 20-inch intervals for centerline restraints is required because the successive openings to the seat track are one inch apart. Thus, allowing the frame 24 of the centerline restraint 10 of the present invention to slidably move relative to the bar 166 allows a more exact alignment of the inside heads 20 or outside heads 22 with the receptacles 16 of the cargo containers.

To achieve this more exact alignment of the centerline restraint 10, a locator pin 198, fixed in position relative to the frame 24, is employed. The locator pin 198 is mounted within a recess in the bottom of one of the support beams 168, and it extends through a channel 200 in bar 166 to a position just below the bottom surface of seat track studs 180, where it fits within a locator hole (not shown) drilled in the base of the seat track 182 marking the exact desired location of the frame 24. Once the locator pin is fit within the locator hole, the frame may not move. The bar 166 is then slid slightly one way or the other so that the engagement stud 196 of plunger 188 may be lowered into the seat track to thereby prevent translational movement of the bar.

In order to facilitate the forward and aft movement of cargo body 14, the centerline restraint 10 of the present invention may include rollers 202 that are freely rotatable around horizontal axles 204 mounted to transverse members 38 (see FIG. 4).

Figure 14:
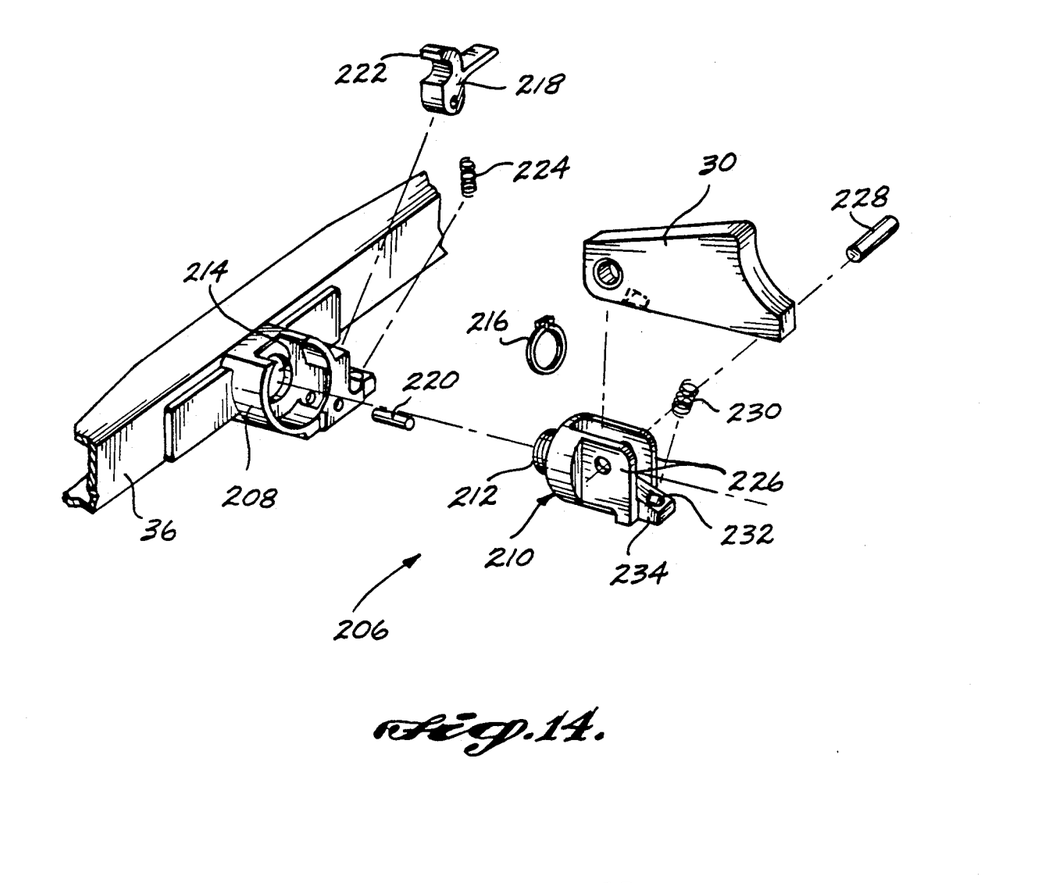
FIG. 14 is an exploded detail view of an alternative embodiment, showing an alternative manner of attaching the release wings to the frame of the centerline restraint.

In an alternative embodiment of the present invention, a lockout mechanism 206 shown in FIG. 14 may be substituted for the double flanges 42 used to pivotally mount release wings 30 to the longitudinal side members 36 of the frame 24. The lockout mechanism 206 includes a bracket 208 mounted to (or integral with) longitudinal side member 36, the bracket having a cylindrical pocket sized to receive a wing rotator 210. The wing rotator has a circular projection 212 that extends through a circular opening 214 formed in both the bracket 208 and the longitudinal side member 36. A lock ring 216 placed just outside the longitudinal side member engages the projection 212 to hold the wing rotator 210 securely within the pocket of bracket 208, yet allowing it to freely rotate. Bracket 208 includes a recessed area configured to accommodate a latch 218 rotatably mounted to the bracket through a pin 220. The latch has a tab 222 that is biased inwardly by a spring 224 to engage a first keyed slot (not shown) in wing rotator 210, thereby restricting rotation of the wing rotator and maintaining the release wing 30 in its normal vertical orientation.

Bracket 208 also includes a pair of spaced-apart flanges 226 sized to receive the release wing 30 therebetween, the release wing being pivotally mounted to the flanges by a pin 228. Additionally, a spring 230, fitting between a recess 232 formed in an extending tongue 234 of the wing rotator 210 and a recess formed in the release wing 30, provides an upward bias to the release wing. Given the configuration described above, the lockout mechanism 206 allows the tab 222 of latch 218 to be manually pulled out of engagement with the first keyed slot (not shown). This allows the wing rotator 210 and, correspondingly, the release wing 30 to be rotated approximately 90° (counterclockwise in FIG. 14), thereby orienting the release wing in a horizontal position and taking it out of potential engagement with the cargo body 14. Because this rotation causes the tab 222 of latch 218 to engage a second keyed slot (not shown) in wing rotator 210, the resultant effect is that the inside heads 20 are locked in their normally upright position.

While a preferred embodiment of the present invention, and one alternative embodiment, have been illustrated and described, it should be understood that variations could be made therein without departing from the spirit and scope of the invention. For instance, while the illustrated invention is primarily intended to be used over the wing box section of a cargo airplane, it could replace current centerline restraints in the remainder of the airplane where cargo may straddle the forward and aft centerline. Accordingly, it is to be understood that the invention is not to be limited to the specific embodiments illustrated and described. Rather, the true scope and spirit of the invention is to be determined by reference to the following claims.

The embodiments of the invention in which an exclusive property or privilege is claimed are defined as follows:

1. An automatically retractable restraint assembly for vertically restraining a body by engagement with a side of the body, the restraint assembly comprising:
   a frame;
   a shaft having a horizontal axis mounted in said frame for rotation about said horizontal axis;
   a first head on said shaft that rotates with said shaft, said first head normally extending above said frame in an upright position and having a toggle extending outwardly therefrom to engage the side of and thereby vertically restrain the body;
   a locking means on said shaft that rotates with said shaft, said locking means having a pair of contacting surfaces disposed on opposite sides of said horizontal axis of said shaft and a pair of projections disposed on opposite sides of said horizontal axis of said shaft;
   a pair of release wings pivotally mounted to said frame on opposite sides of said horizontal axis of said shaft, each release wing having an extension in cooperative engagement with one of said contacting surfaces of said locking means to maintain said first head in its normally upright position, and whereby rotation of one of said release wings upon engagement by the body disengages said extension from said one of said contacting surfaces of said locking means to allow said first head to rotate downwardly into said frame upon engagement by the body, and whereby one of said projections engages the extension of the other of said release wings to lock said first head in a down position upon rotation of said first head into said frame below the bottom of the body;

a first biasing means for urging said first head back to its normally upright position after passage of the body; and a second biasing means for urging said first head toward the body should the body attempt to move out of engagement with said toggle.

2. The restraint assembly of claim 1, further comprising a retractable second head spaced from said first head to engage a body of lesser widthwise dimension.

3. The restraint assembly of claim 2, wherein said second head comprises:

a base pivotally mounted to said frame and normally extending above said frame in an upright position, said base having a toggle extending outwardly therefrom to engage the side of and thereby vertically restrain the body and having at least one roller positioned thereon engagable with the side of the body;

a pair of tapered extensions on opposite sides of said base, each of said tapered extensions having a camming surface that causes collapse of said base downwardly into said frame upon engagement by a body of greater widthwise dimension, thereby allowing utilization of said first head; and a spring acting between said base and said frame for urging said base back to its normally upright position after passage of the body.

4. The restraint assembly of claim 3, further comprising a release mechanism mounted to said frame, whereby said base engages said release mechanism to lock said base in a down position upon collapse of said base into said frame below the bottom of the body of greater widthwise dimension, and whereby manual activation of said release mechanism allows said base to return to its normally upright position.

5. The restraint assembly of claim 1, wherein each release wing is pivotally mounted to a lockout means rotatably mounted to said frame, rotation of said lockout means causing said release wing to rotate downwardly into said frame to a position below the bottom of the body wherein said wing is unengageable by the body but maintains contact with said contacting surface thereby locking said first head in its normally upright position.

6. The restraint assembly of claim 1, further comprising a roller positioned on said first head engagable with the side of the body, said roller having its axis of rotation vertical when said first head is in its normally upright position.

7. The restraint assembly of claim 1, further comprising roller means having a horizontal axis of rotation positioned within said frame for supporting and assisting in the movement of the body over said restraint assembly.

8. The restraint assembly of claim 1, wherein said first biasing means comprises a spring acting between said frame and said shaft.

9. The restraint assembly of claim 1, wherein said second biasing means comprises a spring acting between said shaft and said head.

10. The restraint assembly of claim 1, further comprising a pair of springs disposed between a pair of recesses in said frame on opposite sides of said shaft and a correspondingly aligned recess in the bottom of each of said release wings for upwardly biasing said release wings.

11. The restraint assembly of claim 1, further comprising fastening means having at least one seat track stud located on the bottom of a bar slidably mounted to said frame engageable with a seat track located on the floor of the environment in which said restraint assembly is to be used, and further having a locator pin mounted to said frame engageable with a locator hole in the base of the seat track.

12. An automatically retractable restraint assembly for vertically restraining a body by engagement with a side of the body, the restraint assembly comprising:

a frame haviing a centerline;

a shaft having a horizontal axis mounted in said frame substantially orthogonal to said centerline for rotation about said horizontal axis;

a pair of first heads on said shaft disposed on opposite sides of said centerline that rotate with said shaft, each of said first heads normally extending above said frame in an upright position and having a toggle extending outwardly therefrom to engage the side of and thereby vertically restrain the body;

a locking means on said shaft at said centerline of said frame that rotates with said shaft, said locking means having a pair of contacting surfaces disposed on opposite sides of said horizontal axis of said shaft and a pair of projections disposed on opposite sides of said horizontal axis of said shaft;

a pair of release wings pivotally mounted to said frame along said centerline on opposite sides of said horizontal axis of said shaft, each release wing having an extension in cooperative engagement with one of said contacting surfaces of said locking means to maintain said first heads in their normally upright position, and whereby rotation of one of said release wings upon engagement by the body disengages said extension from said one of said contacting surfaces of said locking means to allow said first heads to rotate downwardly into said frame upon engagement by the body, and whereby one of said projections engages the extension of the other of said release wings to lock said first heads in a down position upon rotation of said first heads into said frame below the bottom of the body;

a first biasing means for urging said first heads back to their normally upright position after passage of the body;

a second biasing means for urging each of said first heads toward the body should the body attempt to move out of engagement with said toggle; and a pair of retractable second heads spaced in a direction away from said centerline from said first heads to engage a body of lesser widthwise dimension.

13. The restraint assembly of claim 12, wherein each of said second heads comprises:

a base pivotally mounted to said frame and normally extending above said frame in an upright position, said base having a toggle extending outwardly therefrom to engage the side of and thereby vertically restrain the body and having at least one roller positioned thereon engagable with the side of the body;

a pair of tapered extensions on opposite sides of base, each of said tapered extensions having a camming surface that causes collapse of said base downwardly into said frame upon engagement by a body of greater widthwise dimension, thereby allowing utilization of said first head; and a spring acting between said base and said frame for urging said base back to its normally upright position after passage of the body.

14. The restraint assembly of claim 13, further comprising a release mechanism mounted to said frame, whereby said base engages said release mechanism to lock said base in a down position upon collapse of said base into said frame below the bottom of the body of greater widthwise dimension, and whereby manual activation of said release mechanism allows said base to return to its normally upright position.

* * * * *